United States Patent Office 3,083,224
Patented Mar. 26, 1963

3,083,224
POLYFLUOROALKYL PHOSPHATES
Neal O. Brace, Wilmington, Del., and Alan K. Mackenzie, Redding, Conn., assignors to E. I. du Pont de Nemours and Company, Wilmington, Del., a corporation of Delaware
No Drawing. Filed Dec. 8, 1961, Ser. No. 158,128
6 Claims. Cl. (260—461)

This invention relates to a novel class of fluoroalkyl compounds. It is an object of this invention to provide novel compounds which are useful in imparting oil repellency to textile materials, paper and similar articles, and also as dispersing agents. Other objects and achievements of this invention will become apparent as the description proceeds.

In U.S. Patent No. 2,559,749, a series of water-soluble polyfluoroalkyl phosphates are described which can be expressed by the formula $$[B(CF_2)_nCH_2O]_2PO(OM) \qquad (I)$$

wherein B is hydrogen or fluorine, $n$ is an integer from 2 to 4 inclusive, and M is hydrogen, alkali metal, ammonium or substituted ammonium. The patentee, A. F. Benning, found said compounds to act as surprisingly efficient dispersing agents and made use of them in his disclosure for improving the polymerization of unsaturated organic compounds in an aqueous medium to obtain a colloidal dispersion. As one instance of a compound of the above general formula wherein B is fluorine, Benning names ammonium di(heptafluorobutyl) phosphate:

$$(CF_3CF_2CF_2CH_2O)_2PO(ONH_4)$$

We have now found that ω-fluoro-polyfluoroalkyl phosphates whose alkyl structure contains a straight chain of at least 8 C-atoms and not less than 9 F-atoms have the surprising and very useful property of being powerful oil-repellency agents for textile fibers, paper and similar materials, in addition to their quality of acting as dispersing agents.

Accordingly, this invention comprises a series of novel polyfluoroalkyl phosphates, which may be defined by the general formula $$[C_mF_{2m+1}.C_nH_{2n}.O]_yPO(OM)_{3-y} \qquad (II)$$

wherein M stands for a water-solubilizing cation such as hydrogen, an alkali-metal, ammonium or substituted ammonium; $y$ is a number of average value from 1.0 to 2.5; $n$ is an integer from 1 to 16, $m$ is an integer from 4 to 12, but the two radicals $C_m$ and $C_n$ contain jointly a straight chain of not less than 8 C-atoms.

The quality of our novel compounds of acting as oil-repellents is very surprising, because the said Benning patent has not mentioned the property of oil-repellency at all in connection with the compounds defined by his formula. Furthermore, in the analogous case of water-repellency, wherein stearamidomethyl pyridinium chloride was at one time the most popular practical agent on the market for said purpose, it had been observed that analogous compounds in which the stearamido radical was separated from the nitrogen atom of the pyridinium radical by a link of 2 or more $CH_2$ groups (e.g. ethylene) were totally ineffective, whereas in the instant invention a chain of $CH_2$ groups in the molecule is permissible as long as $(m+n)$ equals at least 8. Especially good oil-repellency results are obtained, for instance, with the compounds which have the formulas $$[F(CF_2)_6CH_2CH_2O]_2PO(ONH_4)$$

$$[F(CF_2)_4(CH_2)_4O]_2PO(ONH_4)$$

and $$[F(CF_2)_8(CH_2)_{11}O]_2PO(ONH_4)$$

The novel phosphates of this invention may be prepared by reacting the corresponding polyfluoroalkanols of formula $$C_mF_{2m+1}C_nH_{2n}OH \qquad (III)$$

with phosphorus oxychloride in the presence of an acid acceptor such as pyridine or with phosphorus pentoxide, in the optional presence of an organic liquid diluent such as benzene, toluene or xylene. One to two moles of the polyfluoroalkanol are employed per mole of phosphorus oxychloride, and the reaction is preferably effected by heating the mixture at reflux temperature, and following in general the procedural steps set forth in the various examples of U.S. Patent No. 2,597,702.

As in that patent, the products may be isolated as free acid ($M=H$) and then converted, by neutralization with the appropriate base, into an alkali-metal (sodium or potassium), ammonium or substituted ammonium salt. As convenient bases for obtaining substituted ammonium salts may be used commonly available, water-soluble, primary, secondary or tertiary amines such as methylamine, diethylamine, monoethanol amine, diethanolamine, morpholine, triethanolamine and bis(3-hydroxypropyl)amine.

Other methods of synthesis are also available and are summarized at the end of this specification.

The polyfluoroalkanols themselves, of Formula III above, may be prepared by reacting the corresponding perfluoro-iodoalkane of formula $C_mF_{2m+1}I$, which may be straight-chain or branched, with an omega alkenyl acetate of the formula $$CH_2{=}CH{-}C_{n-2}H_{2n-4}.OCOCH_3 \qquad (IV)$$

followed by reduction of the addition compound and subsequent hydrolysis to split off the acetyl group. The radical $C_{n-2}H_{2n-4}$ may likewise be straight-chain or branched. When $n$ is 2, this radical drops out and Formula IV then designates simply vinyl acetate. When $n$ is greater than 2, alternative methods of synthesis are available, wherein the alkenyl acetate of Formula IV is replaced by an omega alkenoate or an omega alken-1-ol, and no final hydrolysis step is needed. The perfluoroiodoalkane may also be reacted with an alkenoic acid followed by esterification and reduction, or with ethylene followed by conversion to the corresponding acetate and subsequent hydrolysis to provide a polyfluoroalkanol.

Without limiting this invention, the following examples are given to illustrate the preferred mode of operation. Parts mentioned are by weight.

EXAMPLE 1

*Ammonium Bis(5 Through 8-Nonafluorooctyl) Phosphate*

The above phosphate ester was prepared by reacting nonafluoro-1-iodobutane with 3-buten-1-ol to give the compound $C_4F_9.CH_2.CHI.CH_2CH_2OH$; reducing the latter to replace the iodine by hydrogen, and reacting the resulting polyfluoro-octanol (of formula $C_4F_9.C_4H_8OH$) with phosphorus oxychloride, followed by treatment with ammonia.

(a) Preparation of Nonafluoro-1-Iodobutane and Higher Polyfluoro-1-Iodoalkanes Into a stainless steel autoclave at 144° C. and a pressure of 600 p.s.i.g., were continuously fed tetrafluoroethylene, at a rate of 438 parts per hour, and pentafluoro-iodoethane containing 1% by weight of di-tert-butyl peroxide, at a rate of 2,078 parts per hour, the mole ratio of $C_2F_5I$ to $C_2F_4$ thus being 1.91. The reaction products were passed through a brine-cooled condenser and collected, together with the unreacted pentafluoro-iodoethane, in a receiver held at —50° C. The unreacted tetrafluoroethylene remained uncondensed in this receiver and was collected separately. The liquid reaction product was subjected to fractional distillation, and the following, essentially pure, components were isolated.

| Component: | Boiling point |
|---|---|
| $C_4F_9I$ | 67.8–68° C. at 760 mm. Hg. |
| $C_6F_{13}I$ | 59–60° C. at 105 mm. Hg. |
| $C_8F_{17}I$ | 77–78° C. at 50 mm. Hg. |
| $C_{10}F_{21}I$ (solid) | 111–114° C. at 50 mm. Hg. |

The pentafluoro-iodoethane used in this reaction was itself prepared by reacting tetrafluoroethylene with hydrogen fluoride and iodine in the presence of mercuric oxide as described in Example 1 of copending application of Viktor Weinmayr, Serial No. 111,912 (filed May 23, 1961).

(b) Preparation of 5 Through 8-Nonafluoro-1-Octanol

A mixture of 11.5 parts of nonafluoro-1-iodobutane, prepared as above, 2.4 parts of commercial 3-buten-1-ol, and 0.03 part of azo diisobutyronitrile was heated with agitation under nitrogen for about 5 hours at 70° C. The unreacted butenol and polyfluoroiodobutane were stripped off at 40 mm. pressure up to 65° C., and the residue (7 parts) was reduced in ethanol solution with zinc dust and hydrochloric acid. The unreacted zinc was filtered off, and the reaction mass was drowned in water. The separated organic layer was withdrawn, dried, and distilled. The main fraction boiling at 81° C. at 15 mm. exhibited a strong OH absorption in the infrared spectrum and was presumably the compound $$F(CF_2)_4(CH_2)_4OH$$

(c) Reaction With Phosphorus Oxychloride

A solution of 1 part of the 5 through 8-nonafluoro-1-octanol prepared above and 0.14 part of pyridine in 3 parts of dry benzene was gradually added to an agitated solution of 0.27 part of phosphorus oxychloride in 3 parts of dry benzene containing 0.14 part of pyridine and maintained at 0° to 15° C. under nitrogen. (The above quantities are related in moles as follows:

$$C_4F_9.C_4H_8.OH:C_5H_5N:POCl_3=2:2:1.)$$

The reaction mass was warmed to room temperature, refluxed for about 45 minutes and filtered, and the filtrate was stripped of benzene to leave in the still bis(nonafluorooctyl)-phosphochloridate of the formula $$[F(CF_2)_4(CH_2)_4O]_2POCl$$

0.1 part of pyridine and 0.13 part of water were then added, and the mixture was heated with agitation for about 45 minutes. Next, 1 part of concentrated hydrochloric acid in 1 part of water was added with agitation, and the bottom organic layer was separated and washed free from chloride ion with water. The product was dissolved in 7.5 parts of benzene, and the solution treated with ammonia gas at 60° to 75° C. Ammonium bis(nonafluorooctyl)phosphate precipitated as a crystalline solid and was filtered off.

Analysis yielded the following data:

Calculated for $[F(CF_2)_4(CH_2)_4O]_2PO(ONH_4)$: 28.97% C, 3.02% H, 51.60% F. Found: 29.0% C, 3.0% H, 51.45% F.

EXAMPLE 2

Ammonium Bis(1H,1H,2H,2H-Pentadecafluorononyl) Phosphate

The above phosphate was prepared by reacting pentadeca-fluoro-1-iodoheptane ($C_7F_{15}I$) with vinyl acetate, followed by reduction of the iodopolyfluoroalkyl acetate ($C_7F_{15}CH_2CHI·OCOCH_3$) to polyfluoroalkyl acetate; the latter was then hydrolyzed to 1H,1H,2H,2H-pentadecafluoro-1-nonanol ($C_7F_{15}C_2H_4OH$), reacted with phosphorus oxychloride, hydrolyzed and treated with ammonia.

(a) A mixture of 10 parts of commercial pentadecafluoro-1-iodoheptane, 1.74 parts of freshly distilled vinyl acetate (1:1 ratio in moles), and 0.02 part of 2,2'-azodiisobutyronitrile was heated under nitrogen at 70° to 80° C. for 5 hours. Then, 0.8 part of pentadecafluoro-1-iodoheptane and 0.02 part of the azonitrile were added, and heating was continued for two hours. Excess of $C_7F_{15}I$ was pumped off at 60° C. and 8 mm. of mercury, leaving 11.5 parts of liquid residue, which analyzed as containing 95% of the compound $$C_7F_{15}CH_2CHI·OCOCH_3$$

(b) 11 parts of the iodopolyfluoroalkyl acetate thus obtained were dissolved in 16 parts of 95% ethanol, and this solution was added over a one hour period with rapid stirring to a slurry of 4 parts of zinc dust in 24 parts of 95% ethanol and 3 parts of concentrated hydrochloric acid at 60° C. The mixture was then stirred for one hour, cooled to 25° C. and diluted with 20 parts of water. The oil layer was collected and the aqueous layer was extracted with chloroform. Distillation of the combined solutions gave polyfluorononyl acetate, which was then heated at 60° C. for one hour with 10 parts of 10% ethanolic potassium hydroxide. The mixture was then drowned in water, and the polyfluorononanol was extracted with chloroform. After drying the chloroform solution over magnesium sulfate and distilling, there was obtained the compound $C_7F_{15}CH_2CH_2OH$, B.P. 84° C. at 10 mm. Hg., $n_D^{25}$ 1.3164. Its analysis gave the following data:

Calculated: 26.2% C, 1.2% H. Found: 26.4% C, 1.6% H.

(c) The 1H,1H,2H,2H-pentadecafluoro-1-nonanol thus obtained was converted to the ammonium salt of its bis ester of phosphoric acid by the procedure of Example 1, employing the polyfluoro-1-nonanol and phosphorus oxychloride in a molar ratio of 2:1.

Calculated for $[F(CF_2)_7CH_2CH_2O]_2PO(ONH_4)$: 23.82% C, 1.33% H, 62.82% F. Found: 23.8% C, 1.6% H, 62.8% F.

EXAMPLE 3

Mono- and Bis[Decafluoro-12-(Trifluoromethyl)Hexadecyl]Phosphate, Ammonium Salt, of the Formula $$(C_4F_9.\overset{CF_3}{\underset{|}{C}}F.C_{11}H_{22}O)_yPO(ONH_4)_{3-y}, \quad (y=1 \text{ or } 2)$$

The mixture of phosphates was prepared by reacting tridecafluoro-2-iodohexane ($C_4F_9.CFI.CF_3$) with 10-undecenoic acid, reducing and esterifying the reaction product to (12 through 16)decafluoro-2-(trifluoromethyl) hexadecanoic acid ethyl ester $$(C_4F_9.\overset{CF_3}{\underset{|}{C}}F.C_{10}H_{20}.COOC_2H_5)$$

reducing and hydrolyzing the ester to the corresponding polyfluorohexadecanol, and converting the latter to the mixture of phosphate esters.

(a) To a stirred solution of 0.015 part of 2,2′-azodiisobutyronitrile in 10 parts of tridecafluoro-2-iodohexane (prepared as described by Hauptschien et al., J. Am. Chem. Soc. 79, 2549), were added slowly 4.23 parts of 10-undecenoic acid. The mass was then heated at 80° to 90° C. for 4 hours, and unreacted material was distilled off under reduced pressure. The residual oil, constituting (12 through 16)-decafluoro-12-(trifluoromethyl)-10-iodohexadecanoic acid had an iodine content of 20.3% and an $n_D^{25}$ of 1.4149. (Calculated iodine content is 19.3%.)

(b) A solution of 10 parts of the above polyfluoroiodohexadecanoic acid in 24 parts of absolute ethanol was saturated with hydrogen chloride, and 1 part of zinc dust was added with stirring at 65° C. After one hour, another 1 part of zinc was added, and the ethanol solution was again saturated with hydrogen chloride. This procedure was repeated once more after another hour. Esterification of the acid and replacement of the iodine with hydrogen took place at the same time. The colorless solution was cooled to room temperature, filtered from excess zinc, drowned in 100 parts of water, and extracted with a 50:50 ethyl ether-benzene mixture. The organic extract was washed with water and fractionally distilled. The ethyl ester of (12 through 16) decafluoro-12(trifluoromethyl)-hexadecanoic acid obtained had a B.P. of 129° C. at 10 mm., and an $n_D^{25}$ of 1.3744.

Calculated for $C_{19}H_{25}F_{13}O_2$: 42.9% C, 4.7% H. Found: 43.2% C, 4.6% H.

(c) Five parts of the above ethyl polyfluorohexadecanoate were dissolved in 18 parts of dry ethyl ether, and the solution was added slowly to a suspension of 0.5 part of lithium aluminum hydride (LiAlH₄) in 27 parts of dry ethyl ether. When the heat of reaction subsided, the mixture was heated externally to reflux for one hour and cooled to 0° to 5° C. Water was then slowly added (about 2 parts) until salts precipitated and gas evolution stopped. The mixture was filtered, the filtrate was dried over magnesium sulfate, and the dry solution was stripped of the ether. The product was identified as (12 through 16)decafluoro-12-(trifluoromethyl)-1-hexadecanol, $C_6F_{13}C_{11}H_{22}OH$, by infrared analysis for hydroxyl.

(d) The above polyfluoro(trifluoromethyl)-hexadecanol was converted to a mixture of mono- and bis-phosphochloridates by reaction with phosphorus oxychloride, the phosphochloridates in turn were hydrolyzed to the phosphates, and the latter were converted to the ammonium salts by procedures as described in Example 1. The final mixture of ammonium mono- and bis[decafluoro-12-(trifluoromethyl)hexadecyl]phosphates (of the formula set forth in the heading of this example), contained about 55% by weight of the bis-ester as determined by carbon and fluorine analyses.

EXAMPLE 4

*Ammonium Bis(1H,1H,2H,2H-Tridecafluorooctyl) Phosphate*

This phosphate was prepared by reacting tridecafluoro-1-iodohexane with ethylene followed by reaction with potassium acetate and hydrolysis to provide 1H,1H,2H,2H-tridecafluoro-1-octanol. The latter was converted to the phosphate as described in Example 1.

A stainless steel autoclave was charged with 10 parts of tridecafluoro-1-iodohexane prepared as described in Example 1 and 0.63 part of ethylene, and was heated for 8 hours at 200° C. with agitation and under autogenous pressure. The reactor was cooled, charged further with 3.3 parts (1.5 moles) of potassium acetate and 20 parts of glacial acetic acid, and heated 6 hours at 200° C. The autoclave was cooled and its contents discharged into 50 parts of a 15% sodium chloride solution. The bottom layer was separated, dried with magnesium sulfate and distilled to yield 1H,1H,2H,2H-tridecafluorooctyl acetate.

The polyfluorooctyl acetate was hydrolyzed as described in Example 2 (for polyfluorononyl acetate). The 1H,1H,2H,2H-tridecafluoro-1-octanol so produced had a boiling point of 93° C. at 35 mm. and gave the following analytical results.

Calculated for $F(CF_2)_6CH_2CH_2OH$: 26.38% C, 1.37% H, 67.87% F. Found: 26.60% C, 1.55% H, 67.8% F.

The analysis of the final phosphate was:

Calculated for $[F(CF_2)_6CH_2CH_2O]_2PO(ONH_4)$: 23.68% C, 1.50% H, 60.90% F. Found: 23.9% C, 1.6% H, 61.30% F.

EXAMPLE 5

*Bis(1H,1H,2H,2H-Heptadecafluorodecyl) Monohydrogen Phosphate*

This phosphate was prepared by the procedure of Example 4, that is by reacting heptadecafluoro-1-iodooctane (from Example 1) with ethylene and potassium acetate to provide 1H,1H,2H,2H-heptadecafluorodecyl acetate; hydrolyzing the latter to 1H,1H,2H,2H-heptadecafluoro-1-decanol, and reacting with phosphorus oxychloride (omitting neutralization with ammonia).

The 1H,1H,2H,2H-heptadecafluoro-1-decanol had a boiling point of 99° C. at 15 mm. pressure, and a melting range of 42° to 44° C. Its analysis was as follows:

Calculated for $F(CF_2)_8CH_2CH_2OH$: 25.88% C, 1.08% H, 68.60% F. Found: 26.1% C, 1.3% H, 66.8% F.

The analysis of the final bis(1H,1H,2H,2H-heptadecafluorodecyl) hydrogen phosphate was as follows:

Calculated for $[F(CF_2)_8CH_2CH_2O]_2PO\cdot OH$: 24.25% C, 0.91% H, 65.21% F, 3.13% P. Found: 24.55% C, 1.2% H, 65.6% F, 3.1% P.

EXAMPLE 6

*Bis(1H,1H,2H,2H-Heneicosafluoro-Dodecyl) Hydrogen Phosphate*

Heneicosafluoro-1-iododecane was put through the same reaction as in Example 4 to provide 1H,1H,2H,2H-heneicosafluoro-dodecyl acetate. The latter was then hydrolyzed to the corresponding polyfluoro-1-dodecanol and was reacted with phosphorus oxychloride to give the bisphosphate product in monohydrogen form.

The intermediate 1H,1H,2H,2H-heneicosafluoro-1-dodecanol had a boiling range of 110° to 114° C. at 10 mm. pressure, and a melting range of 80° to 81° C. Analysis for $F(CF_2)_{10}CH_2CH_2OH$ was:

Calculated: 25.52% C, 0.89% H, 70.74% F. Found: 25.8% C, 0.85% H, 68.8% F.

The analysis of the phosphate bis-ester $$[F(CF_2)_{10}CH_2CH_2O]_2PO\cdot OH$$

was:

Calculated: 24.20% C, 0.76% H, 67.10% F. Found: 25.8% C, 1.0% H, 67.0% F.

EXAMPLE 7

*Bis(Perfluorooctyl-Undecyl) Hydrogen Phosphate:*

$$(C_8F_{17}\cdot C_{11}H_{22}O)_2PO\cdot OH$$

This phosphate ester was prepared by reacting heptadecafluoro-1-iodooctane with ethyl 10-undecenoate, reducing the resultant iodoester to ethyl perfluorooctyl-undecanoate, reducing the latter to perfluorooctyl-undecanol and reacting the product with phosphorus oxychloride in a molar ratio of 2:1.

10 parts of heptadecafluoro-1-iodooctane (from Example 1) were reacted with 4.25 parts of commercial ethyl 10-undecenoate in the presence of 0.1 part of ditert-butyl peroxide, at 135° C., for five hours, under nitrogen. The reaction mass was then stripped of unreacted ethyl 10-undecenoate at 0.7 mm. pressure, and the iodoester reaction product was reduced with zinc and hydrochloric acid in ethanol solution to perfluorooctyl-undecanoate.

The resulting mass was drowned in water. The precipitated yellow solid was recrystallized from ethanol and reduced with lithium aluminum hydride to perfluorooctylundecanol, having a boiling range of 120° to 125° C. at 0.2 mm. pressure and a melting range of 68° to 69° C.

Calculated for $F(CF_2)_8(CH_2)_{11}OH$: 38.64% C, 3.90% H, 54.75% F. Found: 39.05% C, 4.0% H, 53.9% F.

From this polyfluoroalkanol, the bis-ester of phosphoric acid was prepared as set forth in Example 1, omitting the treatment with ammonia gas.

Calculated for $C_{38}H_{45}F_{34}O_4P$: 36.70% C, 3.65% H. Found: 37.30% C, 4.2% H.

EXAMPLE 8

*Mixed Ammonium Mono- and Bis-Esters of (1H,1H,2H, 2H-Tridecafluorooctyl) Phosphate*

The procedure of Example 1 for reacting the polyfluoroalkanol with phosphorus oxychloride was followed, employing 5.4 parts of 1H,1H,2H,2H-tridecafluoro-1-octanol, 1.2 parts of pyridine and 1.56 parts of phosphorus oxychloride (molar ratio=1.5:1.5:1), in 45 parts of benzene. A mixture of ammonium mono- and bis-(1H,1H,2H,2H-tridecafluorooctyl) phosphate was isolated.

Calculated for $[F(CF_2)_6CH_2CH_2O]_{1.5}PO(ONH_4)_{1.5}$: 22.40% C, 1.89% H, 57.70% F. Found: 22.30% C, 2.00% H, 57.20% F.

EXAMPLE 9

*Ammonium Bis(1H,1H-Pentadecafluorooctyl) Phosphate*

This phosphate ester was prepared by converting commercial ammonium perfluorooctanoate to the free acid and then to the ethyl ester, which was reduced with lithium aluminum hydride to 1H,1H-pentadecafluoro-1-octanol, as described in Example 3. The latter was then converted to the ammonium phosphate as described in Example 1.

The ethyl perfluorooctanoate boiled at 93° to 95° C. at 60 mm. Hg pressure. The 1H,1H-pentadecafluoro-1-octanol had a boiling range of 75° to 78° C. at 22 mm. pressure and a melting range of 30° to 33° C. The ammonium bis(1H,1H-pentadecafluorooctyl) phosphate was a white, waxy solid having the following analysis.

Calculated for $[F(CF_2)_7CH_2O]_2PO(ONH_4)$: 21.86% C, 0.91% H, 64.82% F. Found: 21.7% C, 1.1% H, 63.7% F.

The polyfluoroalkyl phosphates prepared in the foregoing examples can be used for treatment of pulp to provide oil repellent paper. This may be done as follows:

EXAMPLE 10—PRODUCING OIL-REPELLENT PAPER (*Note.*—The example hereinbelow employs a cationic nitrogenous copolymer as an aid in exhausting the polyfluoroalkyl phosphate onto the pulp fibers. This feature of the treatment is described in further detail and claimed in copending application of Alan K. Mackenzie, Serial No. 53,884, filed September 6, 1960.)

Four parts of a dry, unbleached kraft pulp were agitated in a vessel containing 300 parts of water, and 4 parts of an aqueous 0.5% solution of polymerized 2-(diethylmethylammonio)ethyl methacrylate methosulfate were added (0.5% of the polymer on the dry weight of the pulp, to exhaust the oil repellent phosphate ester onto the pulp fibers). Agitation was continued for five minutes, and then a quantity of an acetone-water or ethanol-water solution of the phosphate ester was added. (This quantity varied with the particular phosphate ester employed and the amount of the ester to be applied to the pulp. It calculated to be from 0.1% to 0.7% on the weight of the fiber. In the case of the phosphate esters in the acid form, ammonium hydroxide was added to the acetone-water or ethanol-water solution to give a pH of 8 to 9 and the ammonium salt of the ester.) After additional stirring for five minutes, the aqueous pulp was conveyed to the screen of a paper making machine, and a paper sheet was formed and finished in the ordinary way.

Oil repellency of the treated paper was demonstrated by cementing to the surface of the treated paper, and to the surface of untreated control paper, metal cylinders one inch in diameter and one-half inch high, and supporting the sheets of paper on glass so that the under surface could be observed. To each cylinder was then added about 1 ml. of peanut oil. The oil penetrated the untreated paper immediately but was repelled by the treated paper. A summary of the results of oil repellency tests is given in Table I.

TABLE I

*Oil Repellency of Paper Treated with Phosphate Bis-Esters*

[Amount of ester required to repel peanut oil for at least 30 minutes]

| Ex. | Values of m and n [1] | Value of y [1] | Quantity required; percent on wt. of fiber |
|---|---|---|---|
| 1 | 4    4 | 2 | 0.2 |
| 2 | 7    2 | 2 | 0.1 |
| 3 | 6    11 | 1.5 | 0.2 |
| 4 | 6    2 | 2 | 0.1 |
| 5 | 8    2 | 2 | 0.5 |
| 6 | 10   2 | 2 | 0.7 |
| 7 | 8    11 | 2 | 0.4 |
| 8 | 6    2 | 1.5 | 0.3 |
| 9 | 7    1 | 2 | 0.3 |

[1] With reference to Formula II above.

It will be understood that the details of the above examples may be varied widely without departing from the spirit of this invention.

For instance, in lieu of phosphorus oxychloride in the synthesis of our novel phosphates, phosphorus oxybromide or phosphorus pentoxide may be used. When phosphorus oxyhalides are used, the intermediate reaction product is hydrolyzed to form the required phosphate ester, and any tertiary amine that contains no other functional groups may be used as an acid acceptor. Examples are pyridine, trimethylamine, triethylamine, tripropylamine, N,N-dimethylaniline, N,N-diethylaniline, and the like. Suitable solvents or media for the reaction are non-proton donating solvents, and this statement includes aromatic and aliphatic hydrocarbons, halohydrocarbons and ethers. Specific examples of solvents which may be used are benzene, toluene, chlorobenzene, hexane, octane, mixed alkanes, 1-chlorobutane, carbon tetrachloride, propyl ether, butyl ether, dioxane. The reaction may be conducted at a temperature between 0° and 110° C., and preferably at a temperature between 0° to 25° C. for the first stage of the reaction, that is when the polyfluoroalkanol and phosphorus oxyhalide are brought into contact. When phosphorus pentoxide is the reactant, the same and the polyfluoroalkanol are mixed preferably in the ratio of 3 moles of the latter to 1 mole of the former, and the mixture is heated at between 30° and 200° C., without the use of a solvent or base.

An alternative method of forming the novel compounds of this invention is to subject to chlorine oxidation the corresponding bis-(or mixture of mono and bis)-(polyfluoroalkyl) phosphonates, following the procedures described by E. N. Walsh in J.A.C.S., vol. 81, page 3023, for analogous non-fluorinated compounds. These procedures are expressed schematically by the following series of equations, wherein G represents the radical

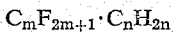

as defined in Formula II hereinabove, R represents the alkyl radical of any conveniently available dialkyl phosphonate (for instance methyl, ethyl or phenyl), and the reactions for producing a bis compound are used to typify the production of both bis, mono and mixtures of these compounds.

*Step 1.*—Formation of the phosphonate.
*Method A*: Ester-interchange with an available dialkyl phosphonate:

*Method B*: Direct reaction with $PCl_3$.
(*a*) Preparation of phosphite:

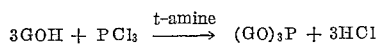

(*b*) Conversion into phosphonate:

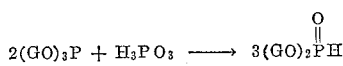

(The initial compound GOH used in these two methods may be prepared as in any of Examples 1 to 8 above.)

*Step 2.*—Oxidation of phosphonate to phosphochloridate:

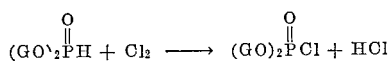

*Step 3.*—Hydrolysis: This is effected by the aid of water and pyridine as in part (*c*) of Example 1 above.

While oil repellency has been emphasized above as the most valuable practical property of the novel compounds, they are adapted also for other practical uses. Thus, those compounds of the new group of phosphate esters that have the required water solubility are useful as surface active agents. Such polyfluoroalkyl phosphates are well adapted as dispersing agents in the polymerization of haloolefins such as tetrafluoroethylene and chlorotrifluoroethylene, where dispersions of the polymers are attained with difficulty in aqueous media in the presence of ordinary dispersing agents.

Where used for oil-repellency purposes, the novel compounds may be applied to a great variety of solid materials, such as textile fabric, textile yarn, leather, paper, plastic sheeting, wood, ceramic clays as well as manufactured articles made therefrom, for instance, wearing apparel, wall paper, paper bags, cardboard boxes, porous earthenware, etc.

In their application for oil-repellency purposes, the bis(fluoroalkyl) phosphates of this invention are immensely more effective than the mono compounds, and where mixtures are unavoidable, it is preferred to use such mixtures wherein the bis(fluoroalkyl) compounds predominate (i.e. $y$ has an average value greater than 1.5). Fully alkylated phosphates (i.e. $y=3$) do not impart oil repellency, but where a mixture is more economically available, they constitute an inert, but harmless diluent to the active bis-compounds. Therefore, mixtures of polyfluoroalkyl phosphates having a $y$-value greater than 2, say up to $y=2.5$, are tolerable. Altogether, an average $y$-value between 1.0 and 2.5 can be used.

The treatment of textile fibers or other water-insoluble solid materials with the novel polyfluoroalkyl phosphates of this invention may be achieved by padding, spraying or brushing using aqueous solutions of said phosphates as described more fully and claimed in copending application of Werner V. Cohen, Serial No. 53,885, filed September 6, 1960. An alternative manner is to include in the procedure a treatment with water-soluble polymers possessing cationic N-atoms, which causes the polyfluoroalkyl phosphate to exhaust onto the fiber from its aqueous solution. This procedure is discussed in further detail and claimed in copending application of Alan K. Mackenzie, Serial No. 53,884, filed September 6, 1960.

We claim as our invention:

1. A fluoroalkyl compound of the formula $$[C_mF_{2m+1} \cdot C_nH_{2n} \cdot O]_yPO(OM)_{3-y}$$

wherein $n$ is an integer from 1 to 16 inclusive, $m$ is an integer from 4 to 12 inclusive, but $C_m$ and $C_n$ jointly contain a straight chain of not less than 8 C-atoms, $y$ is a number of average value from 1.0 to 2.5, and M is a water-solubilizing cation of the group consisting of hydrogen, alkali metal, ammonium and substituted ammonium.

2. A compound as in claim 1, wherein $C_m$ and $C_n$ jointly possess a chain of 8 to 9 C-atoms, $y$ is 2 and M is the ammonium radical.

3. The compound of the formula

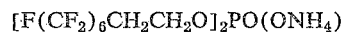

4. The compound of the formula

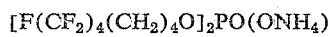

5. The compound of the formula

6. A composition represented by the formula

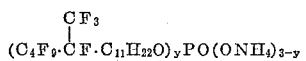

wherein $y$ has an average value from 1 to 2.

References Cited in the file of this patent

UNITED STATES PATENTS

| | | |
|---|---|---|
| 2,750,399 | Gamrath | June 12, 1956 |
| 2,867,645 | Eijk et al. | Jan. 6, 1959 |

OTHER REFERENCES

Kosolapoff "Organic Phosphorus Compounds," 1950, page 254, John Wiley and Sons, Inc., New York, N.Y.